United States Patent Office 3,169,100
Patented Feb. 9, 1965

3,169,100
PRODUCTION OF VITAMIN $B_{12}$-ACTIVITY COMPOSITIONS BY MICROMONOSPORA
Marvin J. Weinstein, East Brunswick, N.J., assignor to Schering Corporation, Bloomfield, N.J., a corporation of New Jersey
No Drawing. Filed Dec. 5, 1962, Ser. No. 242,377
14 Claims. (Cl. 195—80)

This invention relates to an improvement in the production of vitamin $B_{12}$ and compositions of matter having vitamin $B_{12}$-activity, all of which are hereinafter called vitamin $B_{12}$-activity compositions, by the fermentation of a vitamin $B_{12}$-activity producing strain of Micromonospora in an aqueous nutrient medium under aerobic conditions and recovering the vitamin $B_{12}$-activity compositions therefrom.

The genus of microorganisms, Micromonospora is of the order Actinomycetales and several species of the genus are described in "Bergey's Manual of Determinative Bacteriology," 7th edition, 1957, published by The Williams and Wilkins Co., Baltimore, Maryland. These species and others described below are generally available from the public culture cellections such as the American Type Culture Collection (ATCC), Northern Utilization Research and Development Division of the United States Department of Agriculture (NRRL) Peoria, Illinois, and Centraalbureau voor Schimmelcultures, Baarn, Holland (CBS) and others.

Certain species of Micromonospora when cultivated in an aqueous nutrient medium under aerobic conditions produce antibiotic substances simultaneous with the production of vitamin $B_{12}$-activity compositions. Representative of these species are M. purpurea (NRRL 2953), M. echinospora (NRRL 2985), M. echinospora var. ferruginea (NRRL 2995), M. echinospora var. pallida (NRRL 2996), M. carbonacea (NRRL 2972), M. carbonacea var. aurantiaca (NRRL 2997), M. halophytica (NRRL 2998), and M. sp. (ATCC 10026).

Other species of Micromonospora which do not appear to produce antibiotics but do manufacture vitamin $B_{12}$-activity compositions include M. fusca (CBS or NRRL B943), M. chalcea (ATCC 12452) and others.

It is thus an object of this invention to provide a means for producing vitamin $B_{12}$-activity compositions by microorganisms of the genus Micromonospora which hitherto has been unknown to be capable of such production. Vitamin $B_{12}$-activity compositions are produced after relatively short fermentation time in concentrations sufficiently high to warrant economic exploitation. In the fermentation of those antibiotic producing species of Micromonospora, the simultaneous production of vitamin $B_{12}$-activity compositions affords a very valuable by-product which are separable from the reaction mass by methods described later herein.

In order to provide for proper growth of the Micromonospora species with concomitant production of vitamin $B_{12}$, the microorganism is fermented for a period of about 1 to about 7 days at a temperature of about 25° to 40° C., preferably under submerged aerobic conditions in an aqueous nutrient medium containing a source of assimilable carbon and assimilable nitrogen. Suitable carbon sources include carbohydrates such as starches, dextrin, sugars, proteins, amino acids, carbohydrates, and the like. Suitable nitrogen sources include both organic and inorganic nitrogen, preferably the former, such as soybean meal, peptones, polypeptides, casein, and the like. The fermentation is allowed to proceed at a pH of about 6 to 8.

Where the nutrient medium is synthetic and highly refined it may be necessary to add mineral nutrients in order to obtain optimum production of vitamin $B_{12}$-activity compositions. It may thus be desirable in such media to add salts containing elements of potassium, sulfur and phosphorous. Trace quantities of zinc, iron, manganese, magnesium, and cobalt may desirably be added in amounts ranging from about 1 to about 100 p.p.m. Where technical grade or natural materials are used in preparing the medium, such as soybean meal, or tap water, the mineral content is generally already above the minimal concentration of trace elements required. Since cobalt is an essential component of vitamin $B_{12}$, and its presence is necessary for the production of vitamin $B_{12}$, further addition of this element may have a desirable effect provided the concentration is safely below that which is toxic to the organism. The minerals may be added in the form of suitable salts, such as chlorides, sulfates, nitrates and the like. Yields may be further increased by the addition of precursors such as 5,6-dimethylbenzimidazole or by the addition of cyanide ions.

The vitamin $B_{12}$-activity composition producing strains of Micromonospora can be selected by fermenting a nutrient medium with said strain as described above and then microbiologically assaying the resultant whole broth for vitamin $B_{12}$-activity compositions. The assay is effected by tube dilution techniques described in The United States Pharmacopoeia XVI utilizing Lactobacillus leichmannii (ATCC 7830) as test organism or by disc diffusion on agar utilizing Lactobacillus leichmannii (ATCC 4797) as test organism.

In general, for assay purposes, a portion of the whole broth from a fermentation is acidified to about pH 1.5–2.0, centrifuged; the liquor separated and neutralized with sodium hydroxide. Some species of Micromonospora when fermented produce antibiotics which are not destroyed by the acid extraction and which might interfere with the assay against Lactobacillus leichmannii. It is thus necessary at this juncture to determine whether such interfering antibiotics are present. This is accomplished by standard techniques such as disc diffusion on agar utilizing Lactobacillus leichmannii (ATCC 7830 or 4797) grown in a complete medium in which vitamin $B_{12}$ is present. The zones of inhibition of growth are measured to determine the presence of antibiotics. If antibiotic substances are present they may be removed by solvent extraction or adsorption onto resins or charcoal which satisfactorily effect removal of the interfering substances leaving the liquor ready for vitamin $B_{12}$ assay or from which vitamin $B_{12}$-active compositions may be separated.

Vitamin $B_{12}$-activity compositions are recoverable from whole broths resulting from the fermentation of a vitamin $B_{12}$-activity producing strain of Micromonospora. The preliminary separation is effected by first acidifying the whole broth and filtering to remove the mycelial cake. The acidification destroys acid-labile antibiotics such as produced by M. carbonacea and its variants. The filtrate is then neutralized and treated in a manner dependent upon the presence or absence of acid-stable antibiotics. If an acid-stable antibiotic is present, such as is produced by M. purpurea, M. echinospora or M. halophytica, and it is desired to remove such antibiotics for ultimate recovery of same, previous knowledge of the solubility properties or the adsorption properties is helpful. With a resin-adsorbable antibiotic, such as is produced by M. purpurea or M. echinospora, the neutralized broth is passed through a column containing a cationic exchange resin (such as IRC–50 Amberlite in its sodium form) or stirred batchwise with the resin. The resin-spent filtrate is then processed as described below. With a solvent extractable antibiotic, such as is produced by M. halophytica; the broth is extracted with a water immiscible solvent, such as chloroform, which extracts the antibiotic, and the aqueous phase processed as described below. The broth, freed of antibiotics, is then treated with activated charcoal, preferably 20 x 40 mesh, upon which the vitamin $B_{12}$-activity compositions are adsorbed.

If separate recovery of produced antibiotics is not desired, the neutralized broth obtained above is treated directly with activated charcoal which adsorbs both the antibiotic substances and the vitamin $B_{12}$-activity compositions. Analogously, the neutralized broth obtained from the fermentation of a non-antibiotic producing species of Micromonospora or an acid-labile producing species of Micromonospora is treated directly with activated charcoal.

The activated charcoal having the vitamin $B_{12}$-activity compositions adsorbed thereto is separated by filtration and the vitamin $B_{12}$-activity compositions desorbed from the charcoal by stirring with an organic base, preferably pyridine. The vitamin $B_{12}$-activity compositions are transferred from solution in pyridine to solution in alcohol, preferably methanol, to solution in benzyl alcohol by successive concentrations and dilutions with appropriate solvents. Removal from benzyl alcohol may be effected such as by adsorption on activated alumina and elution therefrom with methanol followed by precipitation with acetone-ether. Vitamin $B_{12}$-activity compositions obtained in this manner, without further purification, assay at about 40% of the activity of vitamin $B_{12}$. These following examples are given by way of illustration only and not of limitation.

EXAMPLE 1

*Production of vitamin $B_{12}$-activity compositions by fermentation of various species of Micromonospora*

Germination.—A lyophilized culture of the particular species is added to a 300 ml. shake flask containing 100 ml. of the following sterile medium:

| | |
|---|---:|
| Soybean meal _____g__ | 30 |
| Glucose _____g__ | 40 |
| Calcium carbonate _____g__ | 1 |
| Tap water _____ml__ | 1000 |

The flask and contents are incubated for 3–5 days at 25–30° C. on a rotary shaker (280 r.p.m., 2″ stroke).

Fermentation.—A 5 ml. inoculum from the germination stage is added to a 300 ml. shake flask containing 100 ml. of the aforementioned nutrient medium. The flask and contents are shaken for 4–7 days on a rotary shaker at 25–30° C. The whole broth is acidified to pH 1.5–2.0 with sulfuric and centrifuged and the liquor neutralized with sodium hydroxide.

The neutralized broth is tested for antibiotic activity against *Lactobacillus leichmannii* (ATCC 7830 or ATCC 4797). (If antibiotic substance is present it is removed as described heretofore prior to the microbiological assay.)

The results of replicate fermentations and assays utilizing various species of Micromonospora after 7 days' fermentation are set forth below:

| Micromonospora species: | Vitamin $B_{12}$ assay (micrograms/ml.) |
|---|---|
| *purpurea* (NRRL 2953) _____ | 2.0–5.6 |
| *carbonacea* (NRRL 2972) _____ | 0.2–0.3 |
| *echinospora* (NRRL 2985) _____ | 0.5–3.5 |
| *halophytica* (NRRL 2998) _____ | 2.8 |
| *fusca* (CBS) _____ | 1.7 |
| *chalcea* (ATCC 12452) _____ | 6.0 |
| Sp. (ATCC 10076) _____ | 0.66–0.93 |

In the foregoing fermentation runs, the medium prior to fermentation was examined and found to contain no detectable quantities of vitamin $B_{12}$-activity compositions.

Analogous results are obtained by utilizing the following medium for fermentation:

| | |
|---|---:|
| Bacto-beef extract _____g__ | 3 |
| Tryptose _____g__ | 5 |
| Dextrose _____g__ | 1 |
| Starch (soluble) _____g__ | 24 |
| Yeast extract _____g__ | 5 |
| Tap water _____ml__ | 1000 |

The neutralized antibiotic-free liquor obtained herein may be combined with animal feed to provide a nutrient additive of vitamin $B_{12}$-activity compositions for consumption by domestic animals such as hogs, cattle, chickens and the like. Alternatively the liquor may first be concentrated prior to addition to animal feed.

EXAMPLE 2

*Preparation of vitamin $B_{12}$-activity compositions by the fermentation of M. purpurea*

Germination stage.—Add a lyophilized culture of *M. purpurea* to a 300 ml. shake flask containing 100 ml. of the following sterile medium:

| | |
|---|---:|
| Bacto-beef extract _____gm__ | 3 |
| Tryptose _____gm__ | 5 |
| Dextrose _____gm__ | 1 |
| Starch (soluble) _____gm__ | 24 |
| Yeast extract _____gm__ | 5 |
| Tap water _____ml__ | 1000 |

Incubate the flask and its contents for 5 days at 37° C. on a rotary shaker (280 r.p.m., 2″ stroke).

Inoculum preparation stage.—Transfer a 25 ml. inoculum (from the germination stage) to each of four 2-liter flasks, each containing 500 ml. of the sterile medium utilized for germination. Incubate the flasks and contents for 5 days at 28° C. on a rotary shaker (280 r.p.m., 2″ stroke). Pool the contents of the flasks. Add a 25 ml. inoculum (taken from the pool) to each of twenty 2-liter flasks, each containing 500 ml. of the following sterile medium:

| | |
|---|---:|
| Soybean mean _____gm__ | 30 |
| Dextrose (cerelose) _____gm__ | 40 |
| Calcium carbonate _____gm__ | 1 |
| Tap water _____ml__ | 1000 |

Incubate the flasks and contents for 3–5 days at 28° C. on a rotary shaker (280 r.p.m., 2″ stroke). Pool and aseptically transfer hte broth into a sterile inoculum flask having a side arm (total volume about 10 liters).

Fermentation stage.—Aseptically transfer the 10 liters of inoculum to a 65 gallon fermenter containing 50 gallons of the following sterile medium:

| | |
|---|---:|
| Bacto-beef extract _____gm__ | 600 |
| Bacto-tryptose _____gm__ | 1000 |
| Dextrose (cerelose) _____gm__ | 200 |
| Starch (soluble) _____gm__ | 4800 |
| Yeast extract _____gm__ | 1000 |
| Anti-foamer GE 60 (General Electric Co. brand of a silicone defoamer), or other defoamer___ml__ | 100 |
| Tap water, q.s. to 200 liters | |

Adjust pH to 6.9–7.0 before sterilization. Aerobically ferment for 20–30 hours (until the packed cell volume is about 10–15%) under the following conditions:

| | |
|---|---|
| Temperature _____ | 37° C. |
| Sterile air input _____ | 5.4 cubic feet/minute. |
| Pressure _____ | 7 lbs. per sq. in. above atmospheric. |
| Agitation _____ | 180 r.p.m. |

Aseptically transfer the contents of the feremenger to a 675 gallon fermentation tank containing 450 gallons of sterile medium having the following composition:

| | |
|---|---:|
| Yeast extract _____kg__ | 17 |
| Dextrose _____kg__ | 17 |
| Calcium carbonate _____kg__ | 1.7 |
| Anti-foam (GE–60) _____ml__ | 400 |
| Water, q.s. to 450 gallons | |

Ferment at 35° C. while agitating at 120 r.p.m. and introducing air at 7 lbs. per sq. in. above atmospheric, and 15 cu. ft./min., for 24–36 hours.

*Removal of antibiotic substances.*—Acidify the whole broth from the fermentation stage with 12 N sulfuric acid to pH 2. Add 25 kg. of filter acid (Celite) and filter. Neutralize the filtrate with 12 N sodium hydroxide. Add 14 kg. of oxalic acid, stir. Neutralize with 12 N sodium hydoxide. Stir 24–48 hours and filter. Charge the neutralized filtrate to a cationic exchange adsorption column (IRC–50–Amberlite, in its sodium form, resin volume 18–20 liters).

Collect the resin-spent liquor for isolation of vitamin $B_{12}$-activity compositions. The liquor, now devoid of antibiotic, assays at 2.0 mcg./ml. of vitamin $B_{12}$ activity against *Lactobacillus leichmannii*.

The foregoing procedure may be used to provide analogous results emanating from the fermentation of *M. echinospora* and its variants.

EXAMPLE 3

*Isolation of vitamin $B_{12}$-activity compositions*

*Concentration.*—To a 21.5 liter portion of neutralized, resin-spent broth obtained in Example 2 add 1 kg. of activated charcoal. Stir 1.5 hours, filter and wash charcoal until washings are virtually colorless. Suspend the charcoal in 2 liters of pyridine, stir 1 hour and filter. Concentrate the vitamin $B_{12}$-rich pyridine solution to 100 ml. in vacuo. While stirring, add the concentrate to 1.5 liters of methanol. Remove the precipitate by centrifuge and wash with methanol. Combine washings and supernate (1660 ml.) and concentrate in vacuo to 150 ml. (This concentrate assays at 27.5 mcg. vitamin $B_{12}$ per milliter.)

To the concentrate add 85 g. of ammonium sulfate and 25 ml. of benzyl alcohol. Stir for 15 minutes and separate layers by centrifuge. Extract aqueous layer with 25 ml. benzyl alcohol and separate layers by centrifuge. Combine benzyl alcohol extracts, dry over anhydrous sodium sulfate and filter; final volume about 50 ml. (assay 82.5 mcg./mg. vitamin $B_{12}$).

*Purification.*—Prepare an adsorption column (1.5 cm. I.D.) by adding activated alumina to a height of 200 cm. Place the 50 ml. volume of the benzyl alcohol concentrate onto the top of the column. Wash column with methanol-acetone (1:2) until effluent is colorless. Elute column with methanol collecting 39 fractions of 10 ml. each. By assay, fractions 1–6 and 28–39 show little vitamin $B_{12}$ activity and are discarded. Fractions 7–27 are pooled and concentrated in vacuo to about 0.3 ml.

To the concentrate (0.3 ml.) add 2 ml. of methanol, and centrifuge. Add the deep red supernate to 10 ml. of acetone-ether (1:4) and remove the formed precipitate by centrifuge. Triturate the precipitate with 1 ml. of methanol separating phases by centrifuge. Repeat trituration and separate two times and combine liquors. Concentrate to dryness in vacuo; yield 3.0 mg., assay 1.23 mg. vitamin $B_{12}$ (as per U.S. Pharmacopoeia XVI method). The solid matter is identified by comparison of its intra-red spectrum, chromatographic migration properties, and paper ionophoresis properties with analogous properties of authentic vitamin $B_{12}$.

EXAMPLE 4

*Vitamin $B_{12}$-activity compositions from the fermentation of M. carbonacea*

Ferment *M. carbonacea* according to the germination and fermentation procedure of Example 1. To the neutralized broth add 5 to 10 g. of activated charcoal. Stir 1 hour. Work up as described in Example 3 utilizing proportional quantities of solvents and adsorbants.

*M. carbonacea* may alternatively be fermented according to the following procedure and the neutralized broth processed as in Example 3 utilizing 5–10 g. of activated charcoal per 100 ml. of broth:

*Germination stage.*—Aseptically add a lyophilized culture of *M. carbonacea* to a 300 ml. shake flask containing 100 ml. of the following sterile growth medium:

| | | |
|---|---|---|
| Bacto-beef extract | gm | 3 |
| Tryptose | gm | 5 |
| Dextrose | gm | 1 |
| Starch (soluble) | gm | 24 |
| Yeast extract | gm | 5 |
| Tap water | ml | 1000 |

Incubate the flask and its contents for 4 days at 37° C. on a rotary shaker (280 r.p.m., 2″ stroke).

*Fermentation stage.*—Transfer a 25 ml. inoculum (from the germination stage) to each of four 2-liter flasks each containing 500 ml. of the following medium:

| | | |
|---|---|---|
| Yeast | gm | 1 |
| Fish solubles | gm | 1 |
| Corn steep liquor (dry) | gm | 1 |
| Calcium carbonate | gm | 1 |
| Lactose | gm | 30 |
| Tap water | ml | 1000 |

Incubate the flasks and their contents for 2–3 days at 26° C. on a rotary shaker. Pool the contents of the flasks.

Acidify the pooled contents with sulfuric acid. Stir 30 min. and neutralize with sodium hydroxide solution. Treat with charcoal and process according to Example 3.

In like manner, *M. chalcea* and *M. fusca* are fermented and processed to yield vitamin $B_{12}$-activity compositions.

In addition to the species of Micromonospora mentioned heretofore the following species have been mentioned in Bergey's Manual of Determinative Bacteriology, Seventh Edition, 1957, Williams and Wilkins Co., Baltimore, Maryland, and in the Guide to the Identification of Bacteria and Actinomycetes by N. A. Krassilnikov, 1949: *M. parva, M. globosa, M. coerulea, M. vulgaris, M. propionica, M. monospora, M. elongata, M. bicolor*.

I claim:

1. In a process for the manufacture of a composition of matter having vitamin $B_{12}$-activity, the combination of steps including cultivating a vitamin $B_{12}$-activity producing species of Micromonospora in an aqueous nutrient medium, said medium containing at least trace quantities of cobalt in an assimilable form, under aerobic conditions and separating the vitamin $B_{12}$-activity composition therefrom.

2. In a process for the manufacture of a composition of matter having vitamin $B_{12}$-activity, the combination of steps including cultivating a vitamin $B_{12}$-activity producing species of Micromonospora in an aqueous nutrient medium, said medium containing at least trace quantities of cobalt in an assimilable form, under aerobic conditions and separating the vitamin $B_{12}$-activity composition therefrom by steps comprising acidifying the whole broth and adsorbing the vitamin $B_{12}$-activity composition of matter onto charcoal.

3. The process of claim 2 including de-sorbing the charcoal with an organic base.

4. The process of claim 3 wherein the organic base is pyridine.

5. In a process for the manufacture of a composition of matter having vitamin $B_{12}$-activity, the combination of steps including cultivating a vitamin $B_{12}$-activity producing species of Micromonospora, in an aqueous nutrient medium, said medium containing at least trace quantities of cobalt in an assimilable form, under aerobic conditions, said species selected from the group consisting of *M. purpurea, M. echinospora, M. carbonacea, M. halophytica, M. chalcea, M. fusca, M. sp.* (ATCC 10076) and colorable variants thereof and separating the vitamin $B_{12}$-activity composition of matter therefrom.

6. The process of claim 5 wherein the microorganism *M. purpurea*.

7. The process of claim 5 wherein the microorganism is *M. echinospora*.

8. The process of claim 5 wherein the microorganism is *M. echinospora* var. *ferruginea*.

9. The process of claim 5 wherein the microorganism is *M. echinospora* var. *pallida*.

10. The process of claim 5 wherein the microorganism is *M. carbonacea*.

11. The process of claim 5 wherein the microorganism is *M. carbonacea* var. *aurantiaca*.

12. The process of claim 5 wherein the microorganism is *M. halophytica*.

13. The process of claim 5 wherein the microorganism is *M. chalcea*.

14. The process of claim 5 wherein the microorganism is *M. fusca*.

References Cited in the file of this patent

Waksman: "The Actinomycetes," vol. II, published by The Williams & Wilkins Co., Baltimore, 1961.